(12) United States Patent
Mundra et al.

(10) Patent No.: US 10,700,770 B2
(45) Date of Patent: Jun. 30, 2020

(54) SYSTEM, APPARATUS, AND METHOD FOR OPTIMAL MODCOD SELECTION

(71) Applicant: VT IDIRECT, INC., Herndon, VA (US)

(72) Inventors: Satish Mundra, Clarksburg, MD (US); Roshni Gururaj, Ashburn, VA (US); Aneesh Vasudev Dalvi, Ontario (CA); Dave Turpin, Ontario (CA); Mike Patullo, Ontario (CA)

(73) Assignee: VT IDIRECT, INC., Herndon, VA (US)

( * ) Notice: Subject to any disclaimer, the term of this patent is extended or adjusted under 35 U.S.C. 154(b) by 0 days.

(21) Appl. No.: 15/667,912

(22) Filed: Aug. 3, 2017

(65) Prior Publication Data

US 2019/0044612 A1 Feb. 7, 2019

(51) Int. Cl.
*H04B 7/185* (2006.01)
*H04W 64/00* (2009.01)

(52) U.S. Cl.
CPC ...... *H04B 7/18526* (2013.01); *H04W 64/006* (2013.01)

(58) Field of Classification Search
CPC .................. H04B 7/18526; H04W 64/006
See application file for complete search history.

(56) References Cited

U.S. PATENT DOCUMENTS

| | | | |
|---|---|---|---|
| 6,366,601 B1 * | 4/2002 | Ghosh .................... | H04B 7/264 370/347 |
| 7,961,665 B2 | 6/2011 | Kimmich et al. | |
| 8,300,716 B1 * | 10/2012 | Lee ....................... | H04L 1/0003 370/241 |
| 8,909,220 B1 * | 12/2014 | Aftahi .................. | H04B 7/2041 370/316 |
| 2002/0119757 A1 * | 8/2002 | Hamabe ................ | H04L 1/0003 455/69 |
| 2004/0252725 A1 * | 12/2004 | Sun ....................... | H04L 1/0057 370/503 |
| 2009/0060033 A1 * | 3/2009 | Kimmich .............. | H04L 1/0019 375/240.02 |
| 2009/0135789 A1 * | 5/2009 | Snapir ................... | H04H 20/51 370/336 |
| 2009/0258665 A1 * | 10/2009 | Bourlas ................ | H04L 1/0003 455/522 |
| 2009/0316806 A1 * | 12/2009 | Cheng ................... | H04L 5/0007 375/260 |
| 2010/0016023 A1 * | 1/2010 | Yamauchi ............. | H04L 5/0037 455/562.1 |
| 2010/0232431 A1 * | 9/2010 | Sebastian ........... | H04N 7/17318 370/390 |

(Continued)

*Primary Examiner* — Jean B Corrielus
(74) *Attorney, Agent, or Firm* — Xsensus LLP

(57) ABSTRACT

Provided is a method, system, and computer readable medium for satellite communication. The method includes determining an operating modulation and coding scheme (MODCOD) associated with each terminal of a plurality of terminals, the plurality of terminals being a part of an iNet; identifying an optimal MODCOD based on operating MODCODs associated with the plurality of terminals; associating the optimal MODCOD with the iNet; and transmitting a multicast stream to the plurality of terminals based on the optimal MODCOD.

13 Claims, 5 Drawing Sheets

(56) References Cited

U.S. PATENT DOCUMENTS

| | | | |
|---|---|---|---|
| 2011/0003543 A1* | 1/2011 | Laufer | H04B 7/212 |
| | | | 455/3.02 |
| 2014/0233611 A1* | 8/2014 | Beeler | H04B 7/18519 |
| | | | 375/211 |
| 2017/0006117 A1* | 1/2017 | Kafle | H04L 65/4084 |
| 2018/0102949 A1* | 4/2018 | Smith | H04B 17/318 |
| 2018/0167133 A1* | 6/2018 | Choquette | H04W 76/10 |

* cited by examiner

SYSTEM, APPARATUS, AND METHOD FOR OPTIMAL MODCOD SELECTION

BACKGROUND

Service providers may desire to use communication systems to provide high availability to high quality services for their subscribers. The service providers may configure a multicast MODCOD (i.e., modulation and coding scheme) for an iNet regardless of the operating conditions of the terminals associated with the iNet. Lower order MODCODs may use more bandwidth, which make them less bandwidth efficient. Accordingly, what is needed, as recognized by the present inventors, is a method and a system capable of configuring the MODCOD based on current operating conditions of the plurality of terminals.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

An aspect of the invention includes a method for satellite communication. The method comprises determining an operating modulation and coding scheme (MODCOD) associated with each terminal of a plurality of terminals, the plurality of terminals being a part of an iNet; identifying an optimal MODCOD based on operating MODCODs associated with the plurality of terminals; associating the optimal MODCOD with the iNet; and transmit a multicast stream to the plurality of terminals using the optimal MODCOD.

Another aspect of the invention includes, a system for satellite communication. The system comprises processing circuitry. The processing circuitry is configured to determine an operating modulation and coding scheme (MODCOD) associated with each terminal of a plurality of terminals, the plurality of terminals being a part of an iNet; identify an optimal multicast MODCOD based on operating MODCODs associated with the plurality of terminals; associate the optimal MODCOD with the iNet; and transmit a multicast stream to the plurality of terminals using the optimal MODCOD.

The foregoing paragraphs have been provided by way of general introduction, and are not intended to limit the scope of the following claims. The described embodiments, together with further advantages, will be best understood by reference to the following detailed description taken hi conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
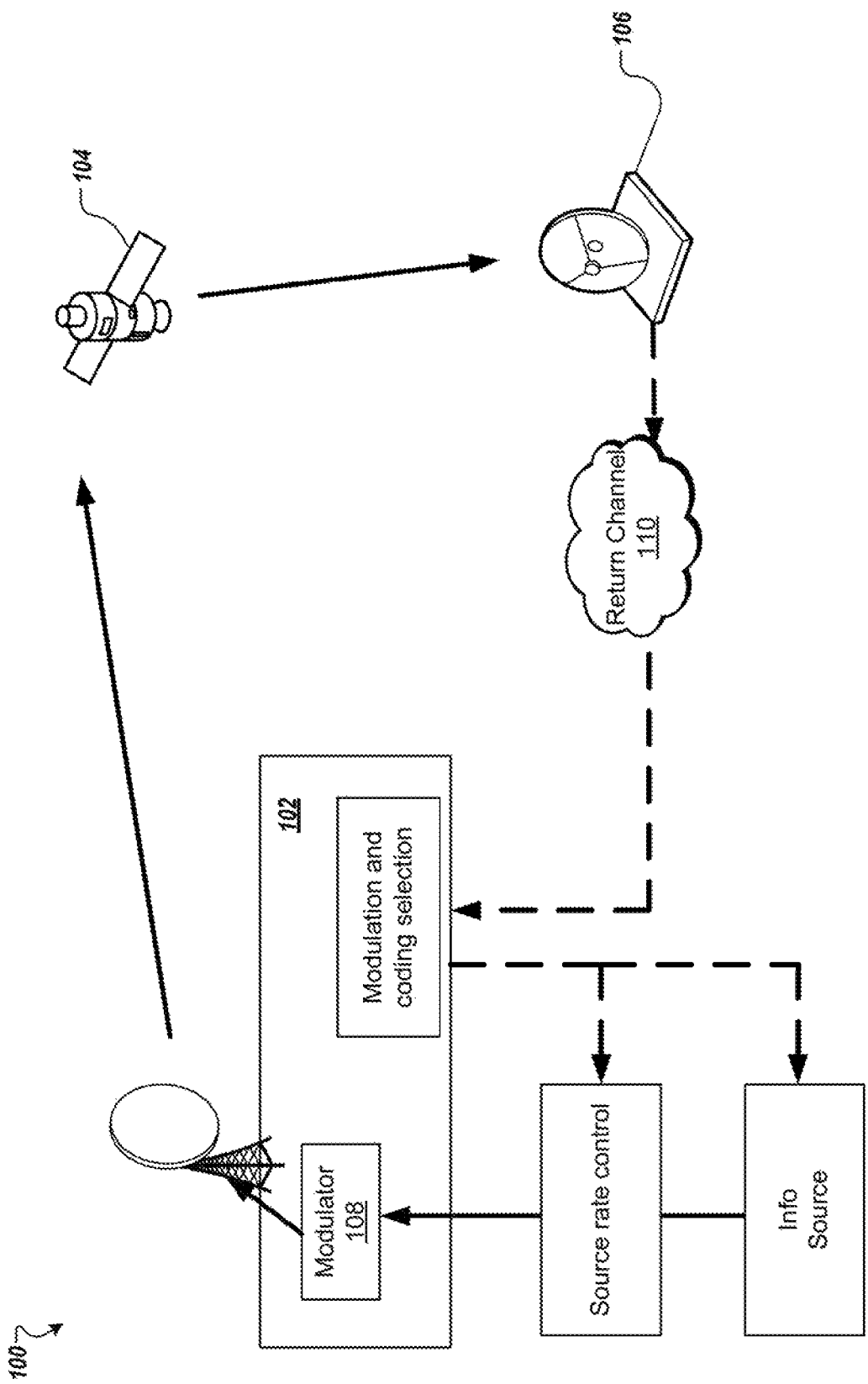
FIG. 1 is an exemplary diagram of an example environment for an adaptive coding and modulation (ACM) satellite link according to one example.

Referring now to the drawings, wherein like reference numerals designate identical at corresponding pans throughout several views, the following description relates to a system and associated methodology for identifying an optimal multicast modulation and coding scheme in a satellite network.

A Global Satellite Network (GSN) may include multiple satellites with multiple beams. Each beam may have multiple channels. Each channel may have multiple group quality of service (GQoS) systems, each with an individual pool of satellite capacity. An individual GQoS is referred to as iNet. An iNet is a combination of a single downstream, (outbound) channel with one upstream (inbound) channel. Characteristics including a frequency, a bandwidth, modulation and coding (MODCOD), and a power define the iNet. For fixed beams, a channel is configured with a single iNet.

Terminals in an iNet are listening to same digital video broadcasting (DVB-S2) downstream and compete for bandwidth within the iNet. An individual downstream channel is associated one individual DVB-S2 and hence forms one iNet so multiple channels make multiple iNets. The method described herein operates within the iNet.

In some embodiments, spot beams are provided by High Throughput satellites (HTS), which is a classification for communication satellites that provide at least twice, though usually by a factor of 20 or more) the total throughput of a classic Fixed Service Satellite (SFS) for the same amount of allocated orbital spectrum thus significantly reducing cost-per-bit.

The dramatic increase in capacity is achieved by a high level frequency re-use and spot beam technology which enables frequency re-use across multiple narrowly focused spot beams (usually in the order of 100s of kilometers), which both are defining technical features of High Throughput Satellites. By contrast, traditional satellite technology, which may be used in alternative embodiments, utilizes much broader beams (usually in the order of 1000s of kilometers) to cover entire continents and regions. Satellites operating in the Ka band are usually considered High Throughput Satellites however this is not a defining criterion. Some Ku band satellites with multiple spot beams are considered HTS. With the advent of HTS and proliferation of terminals of different capabilities a static multicast modulation and coding (referred to herein as MODCOD) may not be the most efficient way for the system to manage and operate multicast services. QoS includes definition and enforcement of service level agreements. Group QoS (GQoS) is applied at an aggregate level to a group of terminals. A Global GQoS extends the same to global satellite network composed of multiple satellites/beams, defines and enforces the service level agreements to ensure the quality of service. The conventional approach may have been less of a concern for legacy broad beam satellites but is not efficient when considering the size and complexity of evolving satellite networks architectures and newer service models with the advent of HTS.

In a conventional approach, the multicast MODCOD is specified for a multicast Subscriber Service Plan Profile (MSSPP) and is statically configured upon system installation and setup, and the multicast MODCOD remains fixed for a given iNet regardless of the operating conditions of terminals. Each terminal may have different and/or changing link conditions (e.g., due to geographic differences in weather, proximity to sources of interference, and the like). According to this conventional approach, some subscribers may not receive a multicast stream when the operating MODCOD of a terminal falls below the configured value. For example, in poor link conditions (e.g., heavy rain) higher order coding and modulation schemes may fail to provide reliable, signal transmission. For example, signal may be corrupted in transmission, arriving at the terminal with low power and high bit error rate. It's also typical for the system to waste capacity when the terminals are capable of receiving the multicast traffic at a higher MODCOD then what is configured statically. In one implementation, MODCOD may include, but are not limited to, QPSK 1/4, QPSK 1/3, QPSK 2/5, QPSK 1/2, QPSK 3/5, QPSK 2/3, QPSK 3/4, QPSK 4/5, QPSK 5/6, QPSK 8/9, QPSK 9/10, QPSK 9/20, QPSK 11/20, QPSK 3/5, 8PSK 2/3, 8PSK 3/4, 8PSK 5/6, 8PSK-L 5/9, 8PSK 8/9, 8PSK 9/10, 16APSK-L 1/2, 16APSK2/3, 16APSK 3/4, 16APSK4/5, 16APSK 5/6, 16APSK-L 5/9, 16APSK7/9, 16APSK8/9, 16APSK 26/45, 16APSK 23/36, 16APSK 25/36, 32APSK 3/4, 32APSK 4/5, 32APSK 5/6, 32APSK 7/9, 32APSK 8/9, 32APSK 9/10, 32APSK 32/45, 32APSK-L 2/3, 64APSK-L 32/45, 64APSK-L 11/15, 64APSK 4/5, 128APSK 3/4, 128APSK 7/9, 256ASPK-L 29/45, 256APSK-L 31/45, 256APSK 32/45, and 256APSK 3/4.

The multicast control protocols are agnostic to the physical layer considerations that are relevant to wireless networks such as satellite networks. Described herein is a methodology that makes the multicast MODCOD dynamic to improve spectral efficiency for multicast services. The MODCOD is dynamically selected based on the current capability of group multicast listeners. This has the advantage to improve efficiency without compromising the service. The method described herein improves service reliability by selecting a lower MODCOD when feasible based on the network conditions.

The method described herein essentially extends the unicast ACM (adaptive coding and modulation) operation defined in Digital Video Broadcasting (DVB) implementation guidelines for second generation system for broadcasting, interactive services, new gathering and other broadband satellite applications (DVB document A171-1) to multicast without making any extensions to over the air protocol and achieves multicast ACM operation by doing intelligent processing on gateway.

FIG. 1 is an exemplary diagram of an example environment 100 for an ACM satellite link. The ACM satellite link includes the gateway 102, a satellite 104, and a satellite receiving terminal 106. The gateway 104 includes a modulator 108. The satellite receiving terminal 106 is connected to the gateway 102 via a return channel 110. The satellite receiving terminal 106 provides to the gateway 102 information about a channel status via the return channel 110. The gateway 102 uses the information about the channel status in coding and modulating data packets addressed to each satellite receiving terminal 106.

Figure 2:
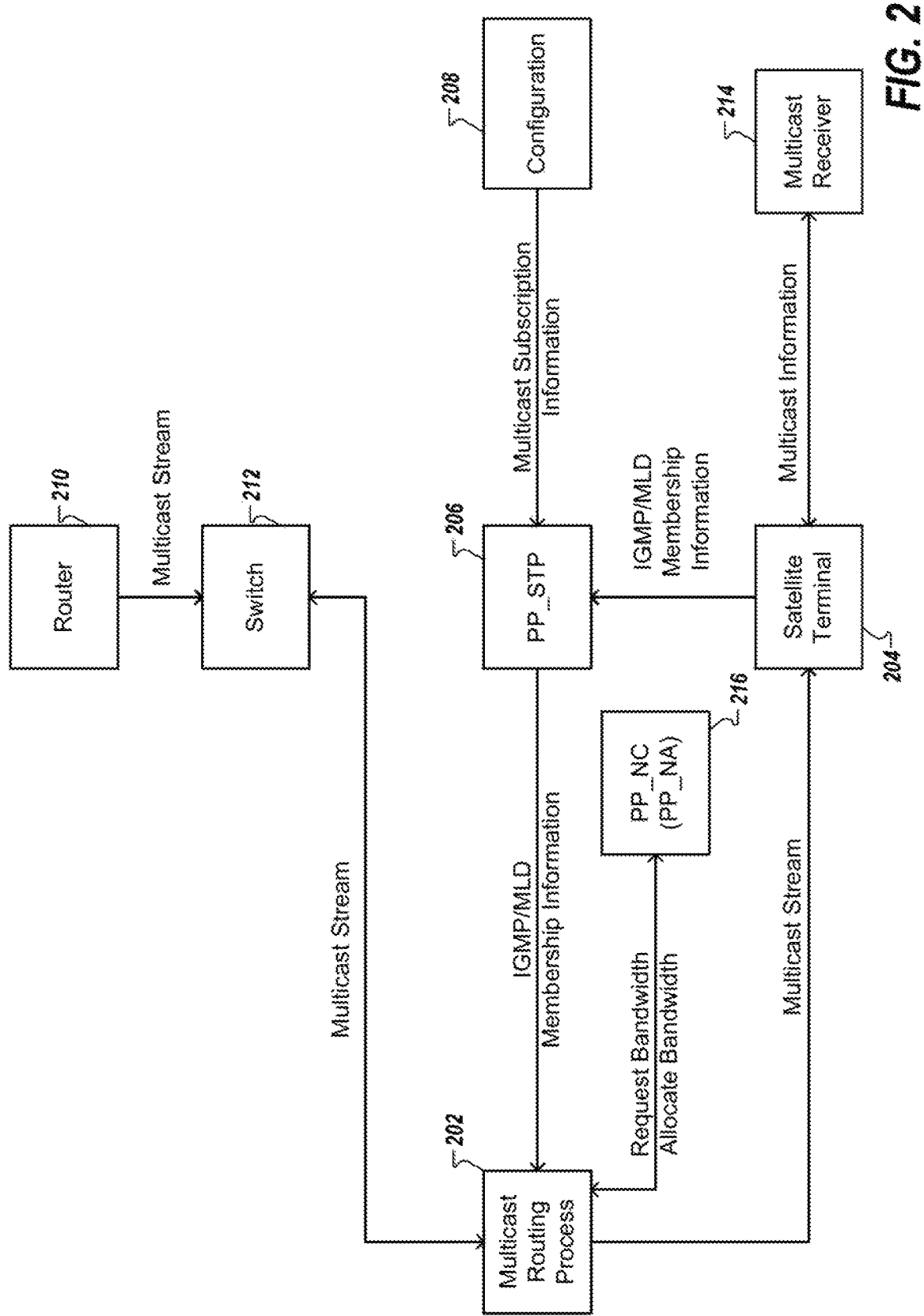
FIG. 2 is a block diagram representation that shows multicast data flow according to one example.

FIG. 2 is a block diagram representation that shows the multicast data flow according to one example. There is one PP_MC (Multicast Controller) 202 per iNet. The PP_MC 202 supports multicast independently in each secure virtual network (SVN) in each regulatory domain. PP_MC 202 is responsible for communicating and obtaining the bandwidth from the bandwidth controller 216 (i.e., PP_MC), and enforcing access controls for multicast streams. The PP_MC 202 uses internet group management protocol (IGMP) and multicast listener discovery protocol (MLD) to communicate with a local area network (LAN) and the backbone edge routers about active multicast memberships.

There is one PP_STP (Satellite Terminal Proxy) 206 per terminal 204. PP_STP 206 is the software process that acts: as configuration manager proxy for the satellite terminal 204 and is responsible for unicast data flow to and from the satellite terminal 204. The terminal is associated with a multicast receiver 214, PP_STP 206 performs all unicast per-packet processing for the satellite terminal 204 within the footprint of the satellite. A particular satellite terminal 204 is represented by exactly one PP_STP 206 in a SAS (Satellite Access Station). PP_STP 206 is responsible for all unicast IP packet handling, including transmission control protocol (TCP) acceleration, link encryption, time division multiple access (TDMA) packet reassembly, packet queuing, and packet compression including compressed real-time transport protocol (CRTP). When the satellite terminal 204 subscribes or unsubscribes to a multicast stream, PP_STP 200 informs the PP_MC 202 in its iNet. A multicast stream refers to a stream of multicast identified by the IPv4 or IPv6 multicast address and a secure virtual network identifier (SVN ID). The PP_MC 202 subscribes to the stream and forwards it on the downstream. PP_STP 206 also notifies PP_MC 202 when it changes regulatory domains or changes iNets.

The PP_STP 206 acts on behalf of the global bandwidth management subsystem (GBMS) as the lowest level of the bandwidth management hierarchy. It includes several modules that are logically part of GBMS and which are described there but that are actually implemented within the PP_STP 206, The global bandwidth management subsystems implement all functions associated with controlling the allocation of satellite bandwidth. This functionality includes not only GQoS at iNet level, but also includes functionality that dynamically adjusts commitments at the iNet level based on the global bandwidth hierarchy built from service plans, aggregated demand, load balancing considerations, and terminal distribution across the global network also referred as Global GQoS enforcement. This subsystem also manages scheduled services and enforces the fair access policy (FAP) at the terminal and group levels. Geographic restrictions are also managed by the GBMS.

Multicast configuration 208: Each multicast stream is identified by a destination multicast address and the SVN ID. The SVN ID corresponds to a unique virtual local area network identifier (VLAN ID). In one implementation, the multicast quality of service (QoS) policies are configured just like the unicast group QoS. Policies such as priority or best effort can be configured. For example, an operator is able to set a committed information rate (CIR) and a maximum information rate (MIR) as appropriate for an application.

The PP_STP 202 maintains the configuration for current subscriptions of its satellite terminal. This configuration is downloaded when the satellite terminal first comes into network. If one or more terminals on an iNet subscribe to a stream, the stream is broadcast on an iNet. Only terminals that subscribe to the stream then forward the stream to a terminal LAN port. A router 210 and a switch 212 perform the routing and switching of IP packets between a source and a destination as would be understood by one of ordinary skill in the arts.

Figure 3:
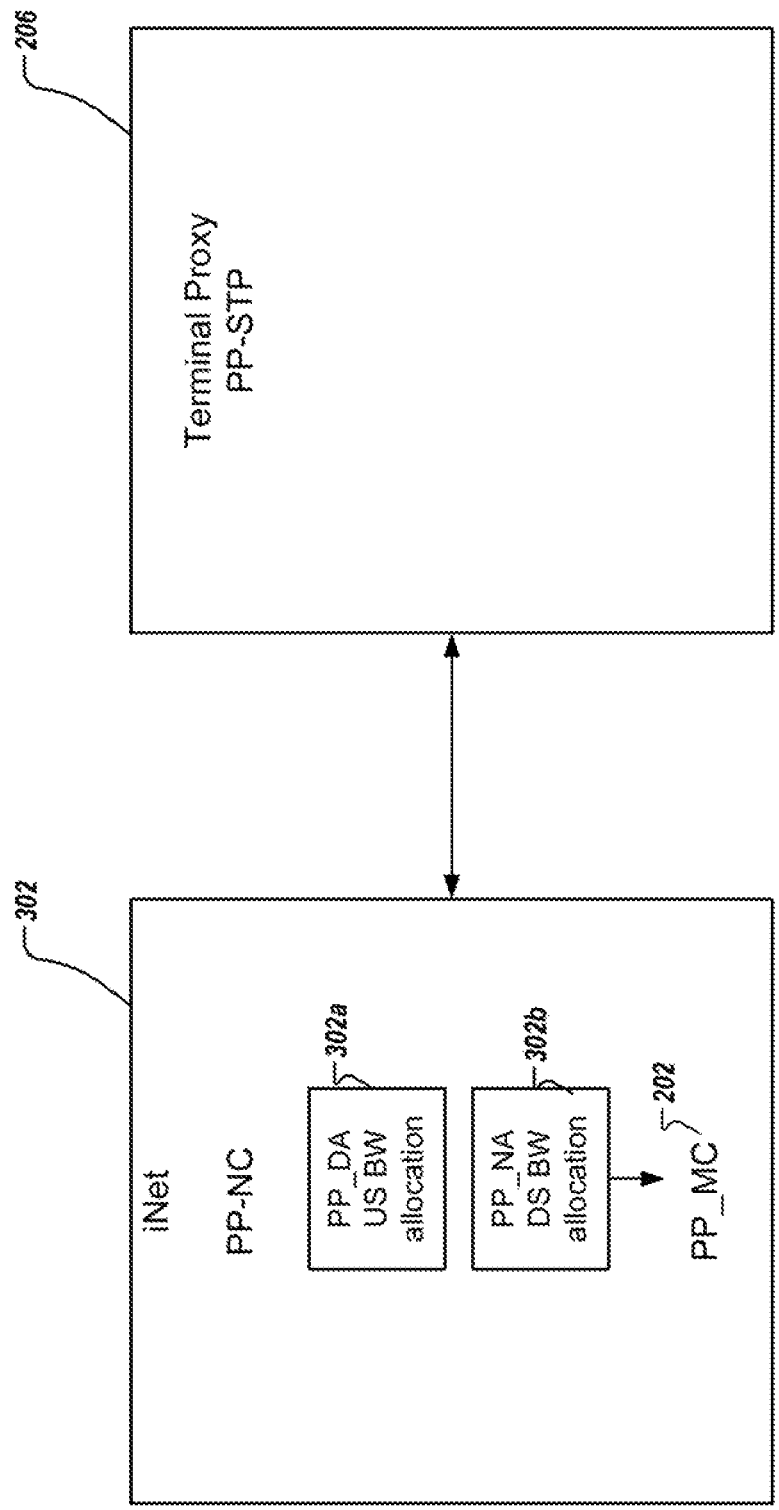
FIG. 3 is a block diagram representation of a global bandwidth manager process architecture according to one example.

FIG. 3 is a block diagram representation of a global bandwidth manager process architecture according to one example. In one implementation, the global bandwidth manager process architecture includes terminal bandwidth management and iNet bandwidth management. The terminal bandwidth management includes the satellite terminal proxy (PP_STP) 206 process running at the hub. There is one PP_STP 206 per terminal which receives the per terminal configuration including the terminal's subscriber service plan as described previously herein.

In one implementation, the iNet bandwidth management is implemented within iNet control processes such as the iNet GQoS 302. There is one PP_NC (Network Control) per iNet. It performs all network control activities including implementing the GQoS bandwidth allocation algorithm for each iNet. It handles bandwidth allocation which includes generation and broadcast of time plans.

PP_NC is implemented as several per-iNet processes. One PP_DA 302a controls the upstream and one PP_NA 302b controls the downstream. These processes interact with the GBWM subsystem and implement part of its functionality. They provide the current demand information and receive the updated QoS parameters for the nodes of the bandwidth allocation tree. PP_IAC handles the upstream adaptive channel interactions, and PP_CNG handles load balancing. When a terminal has upstream or downstream demand, the PP_STP 304 requests allocation from the PP_NC.

In some embodiments, the PP_NA 302b process determines the operating MODCODs of all terminals in a given iNet. Then, the highest common denominator for terminals parts of the particular multicast group is propagated to the PP_MC process 202 of the iNet. The PP_MC process 202 dynamically associates the optimal MODCOD with the multicast data when sending the same to transmit line cards.

In some embodiments, the selected MODCOD is communicated to the global QoS enforcer (GQE). A GQE exists at the iNet Level and a second GQE exists at the network operation center (NOC) level (i.e., enforcing across all iNets/satellites). Subsequent allocation of the MODCOD may be increased or decreased based on the selected MODCOD, thereby enabling more efficient use of system capacity.

The terminal continually or periodically measures the C/N (Carrier-to-Noise power ratio) at which it is receiving the DVB-S2 carrier and periodically reports the value to PP_STP 206. PP_STP 206 communicates the terminal's C/N to PP_NC 302 as part of each request the PP_STP 206 makes for bandwidth on the outbound channel. The C/N is sent to the PP_STP 206 every predetermined period. The predetermined period may be based on the operating conditions. In one implementation, the predetermined period may vary from 1 second to 20 seconds. In one implementation, the C/N is sent to the PP_STP 206 every 5 seconds. In one implementation, the C/N is sent to the PP_STP 206 every 1 second in fade conditions. In other implementations, the C/N is reported to the PP_STP 206 every frame. In one implementation, the terminals may report the C/N as part of the unicast operation. The C/N or the operating MODCOD may be then reported to PP_NC and PP_MC 202 for multicast operation.

The terminal determines the C/N based on a received signal. The terminal demodulates the signal and computes a receiver signal to noise ratio (SNR) using IQ bits. The C/N is a function of a G/T and a SNR. G is the gain of the system and T is the noise temperature.

A DVB-S2 downstream channels capacity is defined by the fixed number of symbols. The same capacity in IP (Bytes) depends on the MODCOD. A higher MODCOD has higher spectral efficiency and can carry more bits per symbol whereas a lower MODCOD carries a smaller number of bits per symbol. So the amount of capacity that is consumed for transmitting a number of bytes depends on the MODCOD being used and system needs to make sure that the bandwidth allocation (when translated to symbols) do not exceed the channel capacity defined in symbols.

This determines the terminal's current downstream MODCOD. The bandwidth request is scaled by the spectral efficiency of this MODCOD. The PP_NC 302 further modifies the QoS parameters for the individual terminal. When bandwidth is granted to the PP_STP 206, it releases data, to the TX_LC which is tagged with the operating MODCOD. The amount of data released is based on the assigned bandwidth.

Figure 4:
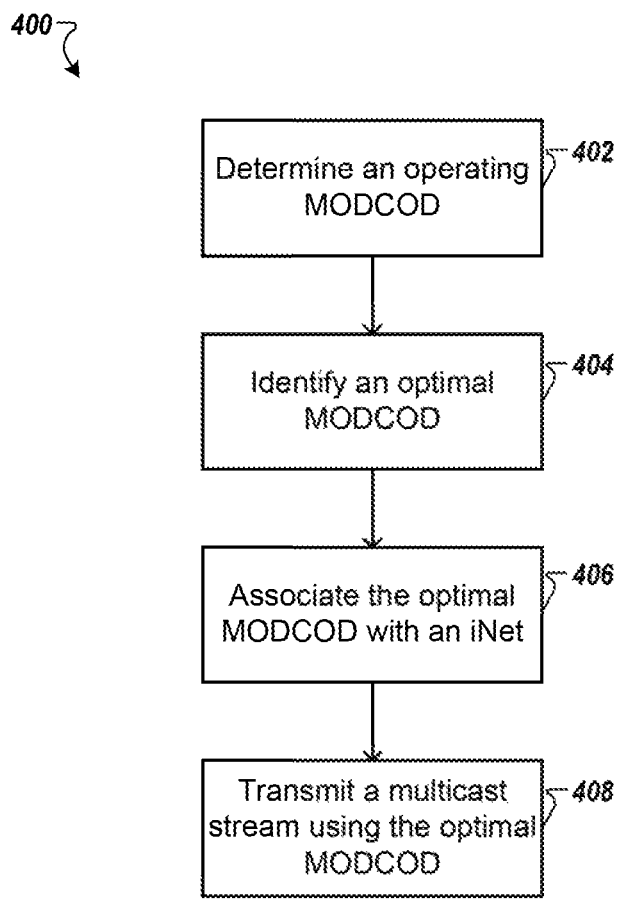
FIG. 4 is a flowchart of a method for optimal modulation and coding (MODCOD) identification according to one example.

FIG. 4 is a flowchart for a method 400 for optimal MODCOD identification according to one example. The method 400 may be performed periodically or when a C/N is received from a terminal. The method 400 may begin by determining an operating MODCOD for each terminal associated with the iNet, at step 402. The operating MODCOD of each terminal Is the MODCOD associated with the current operating conditions of the terminal. In one implementation, the association, may be stored in a table associated with the iNet in the memory. In one implementation, the terminal may periodically or continuously report a naming receive C/N to the PP based on which PP selects the corresponding operating MODCOD by referencing a MODCOD table (e.g., table 1) and instructs the Tx LC (carrier) to forward the packets on that MODCOD to the terminal of interest.

The Operating MODCOD for a given C/N is determined by the MODCOD table derived from link budget analysis. The MODCOD table may be stored on PP. Table 1 shows an exemplary MODCOD table.

TABLE 1

| | NCR ACM Threshold table | | | | | |
|---|---|---|---|---|---|---|
| MODCOD | Modulation | Frame payload | Symbols in frame | Bits/ Symbol | Eb/No QEF(db) | CN QEF(db) |
| 0 | QPSK_1/4 | 2960 | 8370 | 0.3500 | 2.8000 | −1.7000 |
| 1 | QPSK_1/3 | 5120 | 8370 | 0.6100 | 1.4000 | −0.7000 |
| 2 | QPSK_2/5 | 6200 | 8370 | 0.7400 | 1.4000 | 0.1000 |
| 3 | QPSK_1/2 | 6920 | 8370 | 0.8312 | 1.8000 | 1.0000 |
| 4 | QPSK_3/5 | 9440 | 8370 | 1.1300 | 2.0000 | 2.5000 |
| 5 | QPSK_2/3 | 10520 | 8370 | 1.2600 | 2.3000 | 3.3000 |
| 6 | QPSK_3/4 | 11600 | 8370 | 1.3900 | 2.9000 | 4.3000 |

TABLE 1-continued

NCR ACM Threshold table

| MODCOD | Modulation | Frame payload | Symbols in frame | Bits/ Symbol | Eb/No QEF(db) | CN QEF(db) |
|---|---|---|---|---|---|---|
| 7 | QPSK__4/5 | 12320 | 8370 | 1.4700 | 3.2000 | 4.9000 |
| 8 | QPSK__5/6 | 13040 | 8370 | 1.5600 | 3.6000 | 5.5000 |
| 9 | QPSK__8/9 | 14120 | 8370 | 1.6900 | 4.3000 | 6.6000 |
| 10 | QPSK__9/10 | 0 | 0 | 0.0000 | 0.0000 | 0.0000 |
| 11 | 8PSK__3/5 | 9440 | 5598 | 1.6900 | 4.0000 | 6.3000 |
| 12 | 8PSK__2/3 | 10520 | 5598 | 1.8800 | 4.7000 | 7.4000 |
| 13 | 8PSK__3/4 | 11600 | 5598 | 2.0700 | 5.3000 | 8.5000 |
| 14 | 8PSK__5/6 | 13040 | 5598 | 2.3300 | 5.9000 | 9.6000 |
| 15 | 8PSK__8/9 | 14120 | 5598 | 2.5200 | 6.8000 | 10.8000 |
| 16 | 8PSK__9/10 | 0 | 0 | 0.0000 | 0.0000 | 0.0000 |
| 17 | 16PSK__2/3 | 10520 | 4212 | 2.5000 | 5.4000 | 9.4000 |
| 18 | 16PSK__3/4 | 11600 | 4212 | 2.7500 | 6.1000 | 10.5000 |
| 19 | 16PSK__4/5 | 12320 | 4212 | 2.9200 | 6.6000 | 11.3000 |
| 20 | 16PSK__5/6 | 13040 | 4212 | 3.1000 | 7.0000 | 11.9000 |
| 21 | 16PSK__8/9 | 14120 | 4212 | 3.3500 | 7.9000 | 13.2000 |
| 22 | 16PSK__9/10 | 0 | 0 | 0.0000 | 0.0000 | 0.0000 |
| 23 | 32PSK__3/4 | 0 | 0 | 0.0000 | 0.0000 | 0.0000 |
| 24 | 32PSK__4/5 | 0 | 0 | 0.0000 | 0.0000 | 0.0000 |
| 25 | 32PSK__5/6 | 0 | 0 | 0.0000 | 0.0000 | 0.0000 |
| 26 | 32PSK__8/9 | 0 | 0 | 0.0000 | 0.0000 | 0.0000 |

At step 404, an optimal MODCOD is identified. The optimal MODCOD is identified based on the operating MODCODs determined at step 402. In one implementation, the highest common denominator is selected as the optimal MODCOD. In other words, the optimal MODCOD is the lowest of the operating MODCODs of the terminals in a given iNet that are subscribing the same multicast stream. For example, an iNet may include three terminals: a first terminal, a second terminal, and a third terminal. The iNet may have 8PSK 3/5 as the multicast MODCOD (e.g., fixed by the MSSPP). The first terminal may be able to operate at 32APSK 9/10 (i.e., operating MODCOD), the second terminal may be able to operate at 16APSK 2/3, and the third terminal may be able to operate at 32APSK 3/4 based on the current conditions of each terminal. Thus, the optimal MODCOD is identified as 16APSK 2/3 as all the terminals of the iNET are able to receive the multicast stream.

In another example, if the second terminal is able to operate at QPSK 1/3, the second terminal may not receive the multicast stream for the multicast MODCOD of 8PSK 3/5. Thus, the optimal MODCOD is identified QPSK 1/3 in order for the second terminal to receive the multicast stream. In one example, the iNet may include three terminals. Each located at the beam center operating at 16APSK 8/9. In this case, the multicast MODCOD is selected to be 16APSK 8/9. If one terminal drifts to the edge of the beam from the beam center, its receive C/N reduces and hence its operating MODCOD. Assuming the receive C/N associated with the terminal reduces to 5.3 dB, the operating MODCOD drops down to QPSK 4/5 and the new multicast MODCOD is now selected to be QPSK 4/5 which is the minimum of the three.

At step 406, the optimal MODCOD identified at step 404 is propagated to the PP_MC process of the iNet. At step 408, the multicast MODCOD may be changed to the optimal MODCOD for subsequent allocations. The optimal MODCOD is dependent on the operating MODCODs of the terminals in a given iNet. The operating MODCOD can change due to multiple factors such as rain fade, blockage, when a terminal moves from one part of the beam to another when the gain-to-noise-temperature (G/T) of the transponders change. Then, a multicast stream may be transmitted at the optimal MODCOD. The MODCOD is signaled in header bits.

Figure 5:
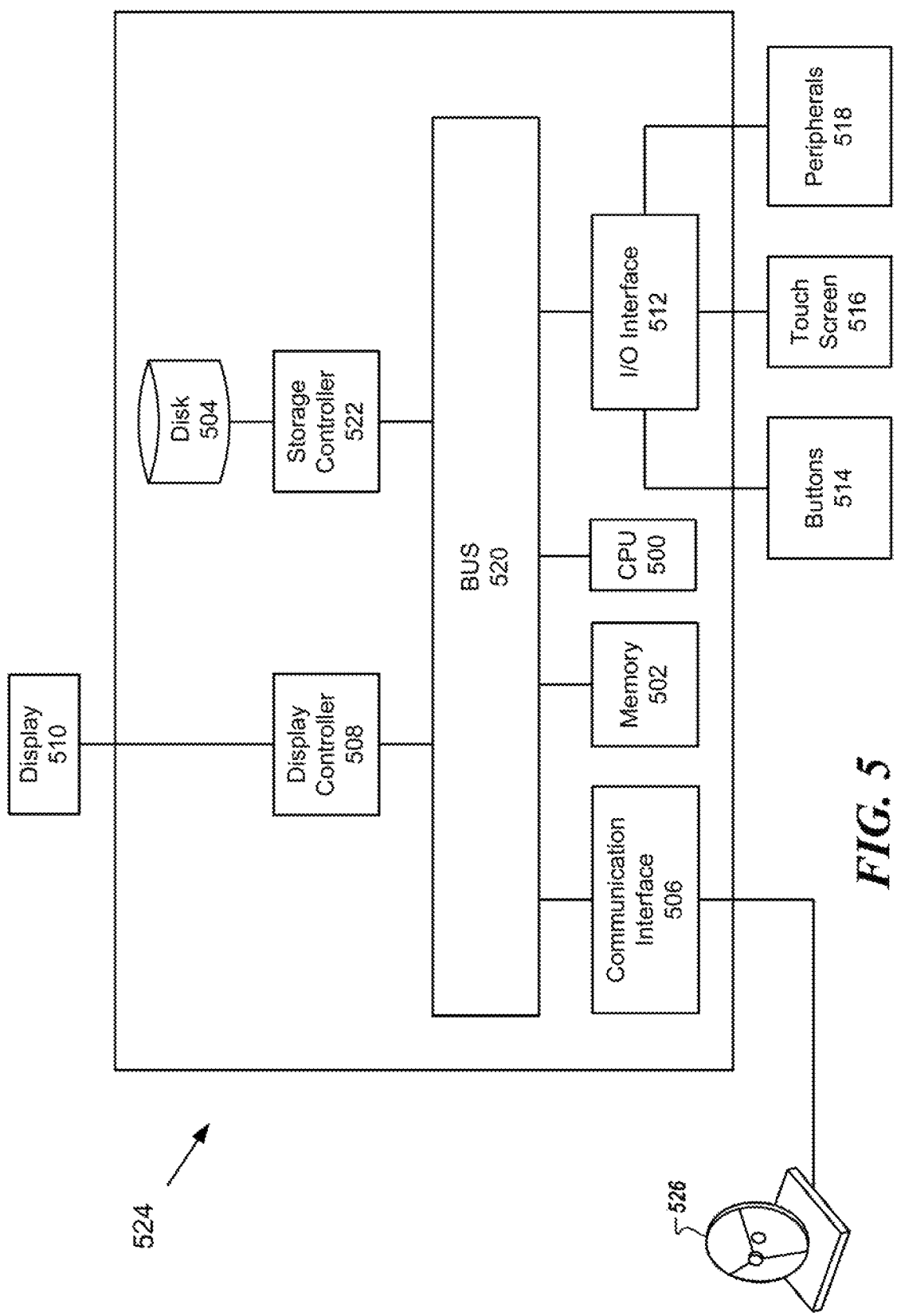
FIG. 5 is a block diagram of a hardware configuration.

FIG. 5 illustrates an embodiment of a hardware configuration used for the iNet and/or terminal in which the processes described herein are implemented. Alternatively, other manners of implementing the processes described herein would be understood by one of ordinary skill in the art. For example, the present embodiments may be implemented using hardware without software, firmware, or combinations of hardware, software, and firmware. The hardware configuration includes a computer 524.

Next, a hardware description of the computer 524 according to exemplary embodiments is described with reference to FIG. 5. In FIG. 5, the computer 524 includes a CPU 500 which performs the processes described herein. The process data and instructions may be stored in memory 502. These, processes and instructions may also be stored on a storage medium disk 504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer communicates, such as a server or computer.

Further, the claimed advancements may be provided as a utility application, background daemon, or component of an operating system, or combination thereof, executing in conjunction with CPU 500 and an operating system such as Microsoft® Windows®, UNIX®, Oracle® Solaris, LINUX®, Apple macOS® and other systems known to those skilled in the art.

In order to achieve the computer 524, the hardware elements may be realized by various circuitry elements, known to those skilled in the art. For example, CPU 500 may be a Xenon® or Core process of from Intel of America or an Opteron processor from AMD of America, or may be other processor types that, would be recognized by one of ordinary skill in the art. Alternatively, the CPU 500 may be implemented on an FPGA, ASIC, PLD or using discrete logic circuits, as one of ordinary skill in the art would recognize. Further, CPU 500 may be implemented as multiple processors cooperatively working in parallel to perform the instructions of the inventive processes described above.

The computer 524 in FIG. 5 also includes a communication interface 506, such as an Intel Ethernet PRO network inter face card from Intel Corporation of America, for interfacing with antenna 526 for communicating over a satellite network.

The computer 524 further includes a display controller 508, such as a NVIDIA® GeForce® GTX or Quadro® graphics adaptor from NVIDIA Corporation of America for interfacing with display 510, such as a Hewlett Packard® HPL2445w LCD monitor. A general purpose I/O interface 512 interfaces with a keyboard and/or mouse 514 as well as an optional touch screen panel 516 on or separate from display 510. General purpose I/O interface also connects to a variety of peripherals 518 including printers and scanners, such as an OfficeJet® or DeskJet® from Hewlett Packard.

The general purpose storage controller 522 connects the storage medium disk 504 with communication bus 520, which may be an ISA, EISA, VESA, PCI, or similar, for interconnecting all of the components of the computer 524. A description of the general features and functionality of the display 510, keyboard and/or mouse 514, as well as the display controller 508, storage controller 522, communication interface 506, and general purpose I/O interface 512 is omitted herein for brevity as these features are known.

The embodiments also include a non-transitory computer readable medium that stores a program, which when executed by a computer or processing apparatus, causes the computer or processing apparatus to perform the methods described herein.

A system which includes the features in the foregoing description provides numerous advantages to users. In particular, the methodologies described herein provide an optimal MODCOD selection based on current condition of the terminals. Thus, the capacity of the system is optimized by minimizing waste. In addition, the spectral efficiency for multicast services is improved.

Obviously, numerous modifications and variations are possible in light of the above teachings. It is therefore to be understood, that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential, characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A satellite communication method, the method comprising:
   determining, using processing circuitry, an operating modulation and coding scheme (MODCOD) associated with each terminal of a plurality of terminals every predetermined period, the plurality of terminals being a part of an iNet;
   identifying, using the processing circuitry, an optimal MODCOD based on the operating MODCODs associated with the plurality of terminals;
   associating, using the processing circuitry, the optimal MODCOD with the iNet;
   transmitting a multicast stream to the plurality of terminals using the optimal MODCOD;
   determining subsequent operating MODCODs based on the optimal MODCOD;
   receiving a carrier-to-noise power ratio from each terminal every predetermined period; and
   determining the operating MODCOD by referencing a look-up table based on the received carrier-to-noise power ratio.

2. The method of claim 1, wherein the predetermined period is 5 seconds.

3. The method of claim 1, wherein the operating MODCOD is determined by a multicast subscriber service plan profile.

4. The method of claim 1, wherein the optimal MODCOD is identified as a lowest MODCOD from the operating MODCODs.

5. The method of claim 1, wherein the operating MODCODs include Quadrature Phase Shift Keying (QPSK) 1/4, QPSK 1/3, QPSK 2/5, QPSK 1/2, QPSK 3/5, QPSK 2/3, QPSK 3/4, QPSK 4/5, QPSK 5/6, QPSK 8/9, QPSK 9/10, QPSK 9/20, QPSK 11/20, 8 Phase Shift Keying (PSK)3/5, 8PSK 2/3, 8PSK 3/4, 8PSK 5/6, 8PSK-L 5/9, 8PSK 8/9, 8PSK 9/10, 16 Amplitude and Phase Shift Keying (APSK)-L 1/2, 16APSK 2/3, 16APSK 3/4, 16APSK 4/5, 16APSK 5/6, 16APSK-L 5/9, 16APSK 7/9, 16APSK 8/9, 16APSK 26/45, 16APSK 23/36, 16APSK 25/36, 32APSK 3/4, 32APSK 4/5, 32APSK 5/6, 32APSK 7/9, 32APSK 8/9, 32APSK 9/10, 32APSK 32/45, 32APSK-L 2/3, 64APSK-L 32/45, 64APSK-L 11/15, 64APSK 4/5, 128APSK 3/4, 128APSK 7/9, 256ASPK-L 29/45, 256APSK-L 31/45, 256APSK 32/45, and 256APSK 3/4.

6. The method of claim 1, further comprising:
   determining, by a terminal, a signal-to-noise ratio (SNR) of received signals using quadrature-carrier (IQ) bits of data; and
   determining the carrier-to-noise power ratio based on at least the SNR.

7. A satellite communication system, the system comprising:
   a plurality of terminals; and
   a base station including processing circuitry configured to
      determine an operating modulation and coding scheme (MODCOD) associated with each terminal of the plurality of terminals every predetermined period, the plurality of terminals being a part of an iNet,
      identify an optimal MODCOD based on the operating MODCODs associated with the plurality of terminals,
      associate the optimal MODCOD with the iNet,
      transmit a multicast stream to the plurality of terminals using the optimal MODCOD,
      determining subsequent operating MODCODs based on the optimal MODCOD,
      receive a carrier-to-noise power ratio from each terminal every predetermined period; and
      determine the operating MODCOD by referencing a look-up table based on the received carrier-to-noise power ratio.

8. The system of claim 7, wherein the predetermined period is 5 seconds.

9. The system of claim 7, wherein each terminal includes processing circuitry and the processing circuitry of each terminal is configured to:

determine a signal-to-noise ratio (SNR) of received signals using quadrature-carrier (IQ) bits of data;
determine the carrier-to-noise power ratio based on at least the SNR; and
transmit the carrier-to-noise power ratio to the base station.

10. The system of claim 7, wherein the operating MODCOD is determined by a multicast subscriber service plan profile.

11. The system of claim 7, wherein the optimal MODCOD is identified as a lowest MODCOD from the operating MODCODs.

12. The system of claim 7, wherein the operating MODCODs include Quadrature Phase Shift Keying (QPSK) 1/4, QPSK 1/3, QPSK 2/5, QPSK 1/2, QPSK 3/5, QPSK 2/3, QPSK 3/4, QPSK 4/5, QPSK 5/6, QPSK 8/9, QPSK 9/10, QPSK 9/20, QPSK 11/20, 8PSK 3/5, 8 Phase Shift Keying (PSK) 2/3, 8PSK 3/4, 8PSK 5/6, 8PSK-L 5/9, 8PSK 8/9, 8PSK 9/10, 16 Amplitude and Phase Shift Keying (APSK)-L 1/2, 16APSK 2/3, 16APSK 3/4, 16APSK 4/5, 16APSK 5/6, 16APSK-L 5/9, 16APSK 7/9, 16APSK 8/9, 16APSK 26/45, 16APSK 23/36, 16APSK 25/36, 32APSK 3/4, 32APSK 4/5, 32APSK 5/6, 32APSK 7/9, 32APSK 8/9, 32APSK 9/10, 32APSK 32/45, 32APSK-L 2/3, 64APSK-L 32/45, 64APSK-L 11/15, 64APSK 4/5, 128APSK 3/4, 128APSK 7/9, 256ASPK-L 29/45, 256APSK-L 31/45, 256APSK 32/45, and 256APSK 3/4.

13. A non-transitory computer readable medium storing computer-readable instructions therein which when executed by a computer cause the computer to perform a method comprising:
determining an operating modulation and coding scheme (MODCOD) associated with each terminal of a plurality of terminals every predetermined period, the plurality of terminals being a part of an iNet;
identifying an optimal MODCOD based on the operating MODCODs associated with the plurality of terminals;
associating the optimal MODCOD with the iNet;
transmitting a multicast stream to the plurality of terminals using the optimal MODCOD;
determining subsequent operating MODCODs based on the optimal MODCOD;
receiving a carrier-to-noise power ratio from each terminal every predetermined period; and
determining the operating MODCOD by referencing a look-up table based on the received carrier-to-noise power ratio.

\* \* \* \* \*